INVENTOR.
DAVID F. HOWARD
BY
Attorney

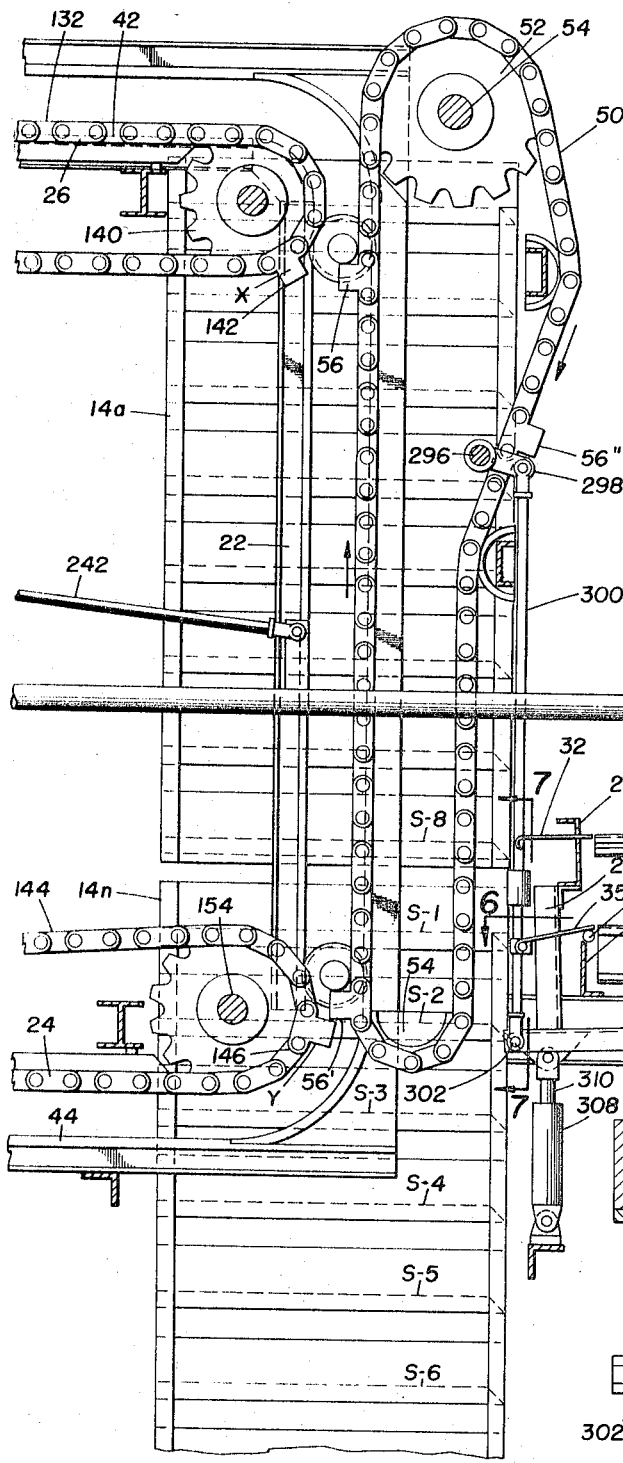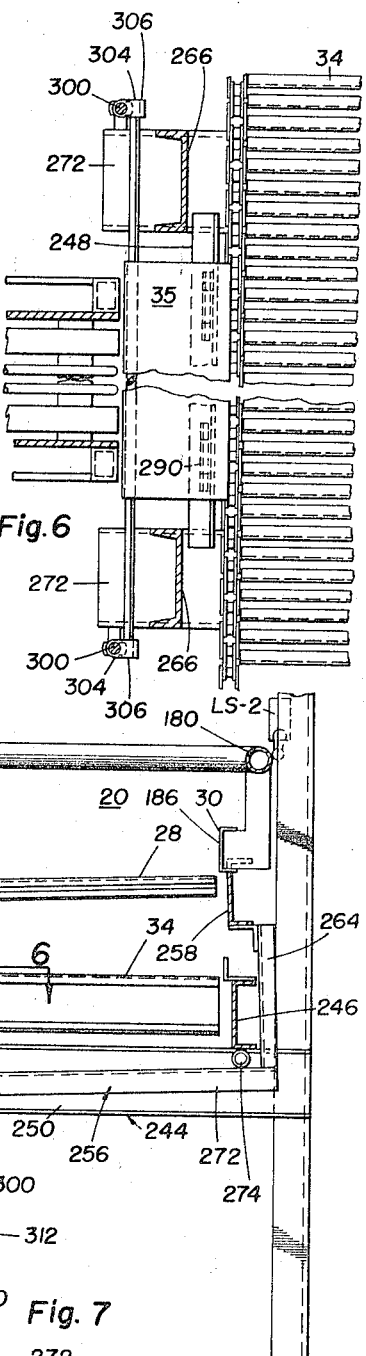

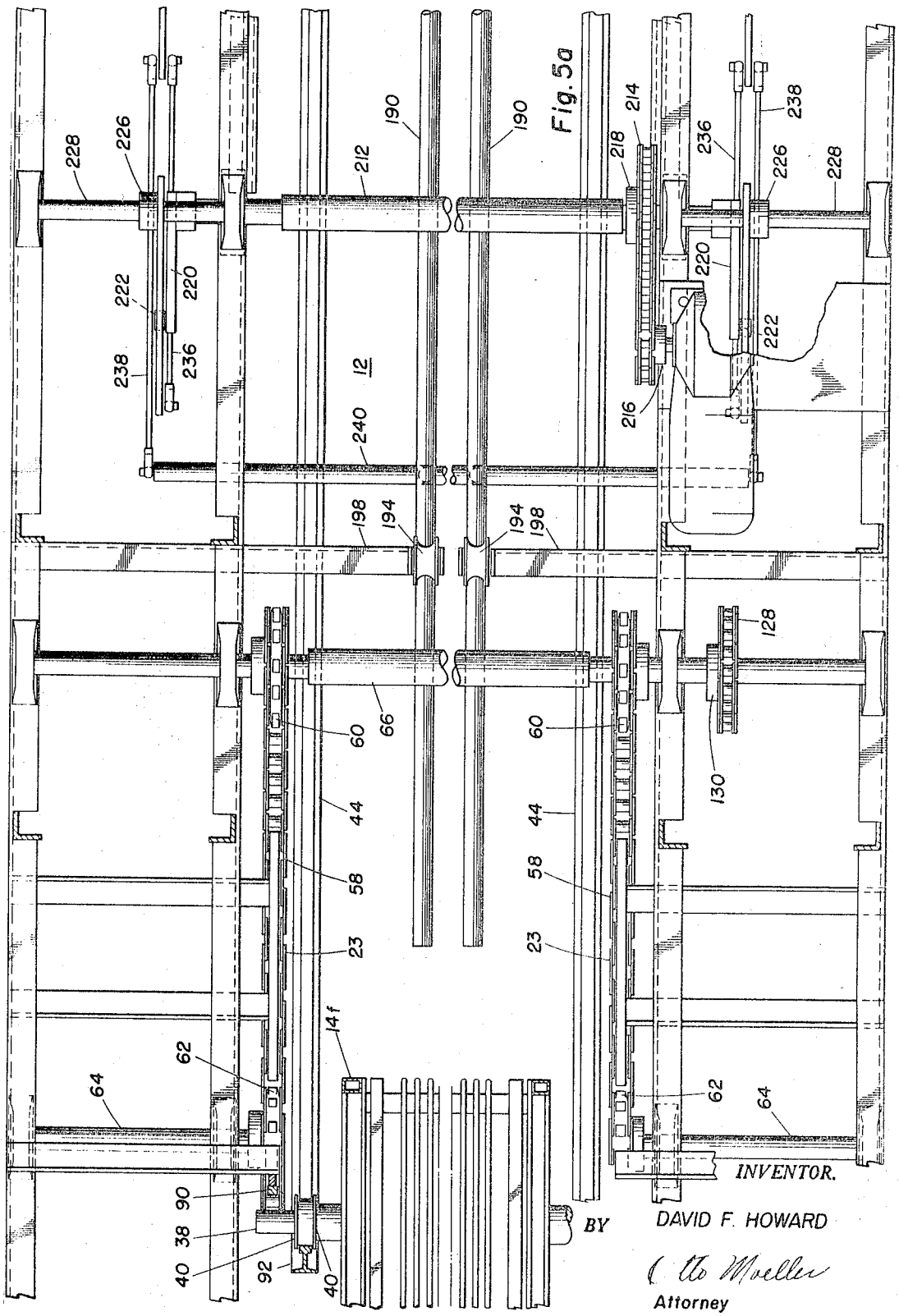

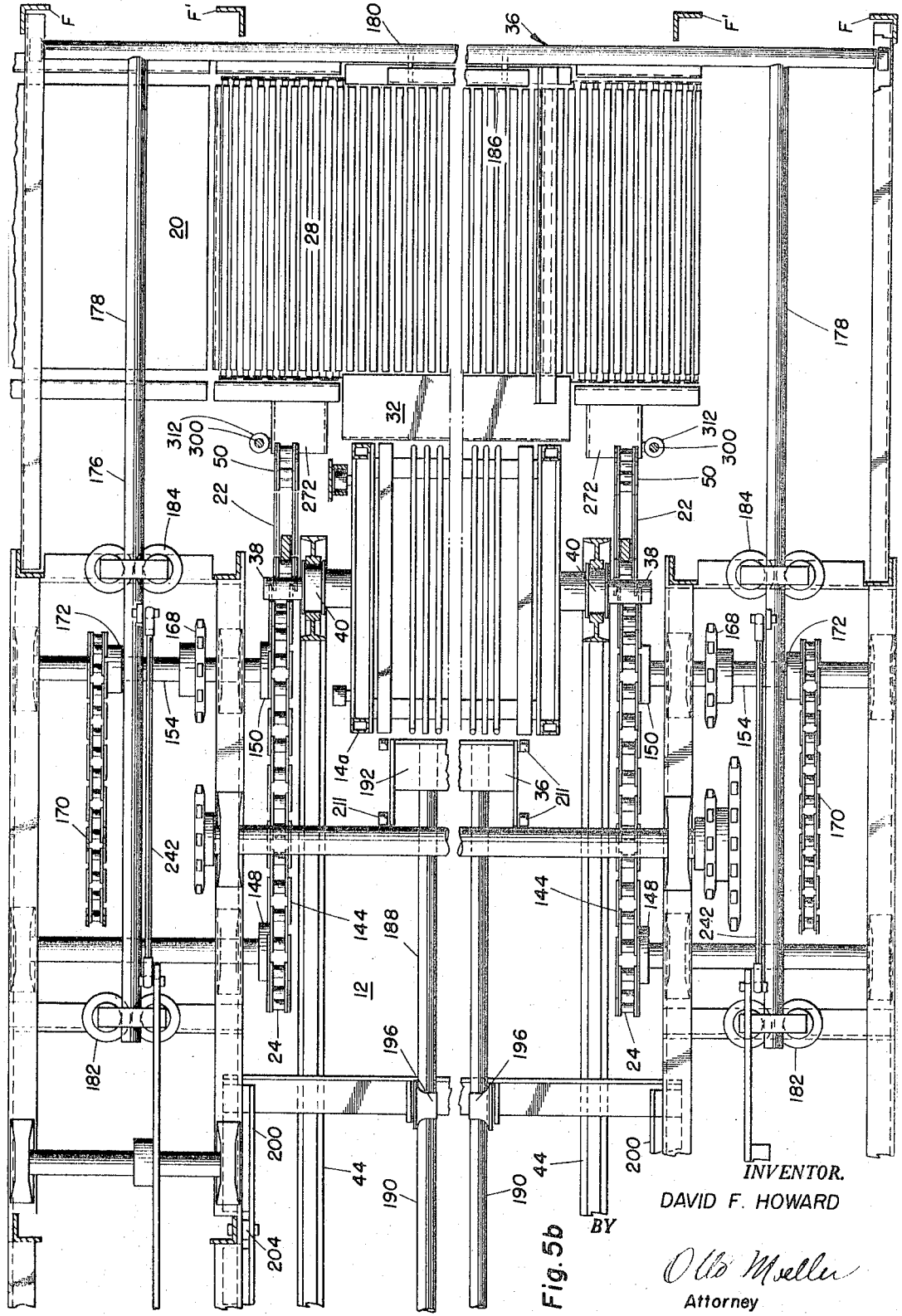

United States Patent Office 3,349,928
Patented Oct. 31, 1967

3,349,928
RACK TYPE DOUGH PROOFER
David F. Howard, York, Pa., assignor to Read Corporation, York, Pa., a corporation of Delaware
Filed May 7, 1964, Ser. No. 365,580
13 Claims. (Cl. 214—16.4)

This invention relates to a continuous dough proofer of the type in which pans of dough to be proofed are disposed on racks in the form of mobile carriers having a plurality of equidistant vertically spaced pan supporting shelves and which racks are movable in a closed loop through the proofing chamber.

The proofing chamber is provided at one end with a common loading and unloading station, at which station are a pair of transversely extending vertically spaced conveyors. The upper or loading conveyor is arranged to transport successive groups of pans of dough into position to be loaded onto successive shelves of the racks as the racks are elevated from the lower longitudinal run to the upper longitudinal run of the closed loop and the lower or unloading conveyor is arranged to receive successive groups of pans of proofed dough unloaded from successive shelves of the racks as the racks are elevated. A loading pusher sweeps successive rows of pans of dough from the loading conveyor onto successive rack shelves, and an unloading pusher sweeps successive rows of pans of proofed dough from successive rack shelves onto the unloading conveyor.

An important feature of the invention resides in the provision of novel and improved means in apparatus of the kind referred to about, for simultaneously loading and unloading not only each of two successive shelves of each rack but also the bottom shelf of each rack and the top shelf of a succeeding rack as the said racks are continuously elevated through the loading and unloading station.

Another object is to provide in such apparatus simple and efficient means for effecting smooth transfer of the pans of dough between the shelves of the racks and the loading and unloading conveyors by the loading and unloading pushers, while the racks are continuously being elevated and the loading and unloading conveyors remain in fixed position, and which renders negligible any possibility of jamming or jarring of the pans during such transfer. It is of particular importance to minimize jarring of the proofed dough in its transfer from the shelves of the continuously vertically moving racks to the stationary unloading conveyor, since proofed dough is sensitive to shock resulting in a poor or unsaleable loaf of bread.

The closed rack conducting loop includes upper and lower tracks along which contiguous racks are adapted to be pushed, and the invention contemplates a novel and improved construction and operative relation of elements including a rack elevating conveyor, a rack advancing conveyor along the forward end portion of the lower tracks adjacent the lower end of the rack elevating conveyor and a rack discharge conveyor along the forward end portion of the upper tracks adjacent the upper end of the rack elevating conveyor, whereby successive racks are advanced by the rack advancing conveyor into position to be picked up by the rack elevating conveyor so that the top shelf of each such successive rack is spaced a shelf space from the bottom shelf of a preceding rack being elevated through the loading and unloading station to insure two successive rack shelves of the same or two succeeding racks being always in position for simultaneous loading and unloading, and whereby the rack discharge conveyor picks up successive racks from the rack elevating conveyor after having been unloaded and loaded and discharges them along said upper tracks out of the vertical path of a succeeding rack.

Other objects and advantages reside in certain novel and improved features of construction, arrangement and combination of parts which are hereinafter more fully described, reference being had to the accompanying drawings forming a part of this specification, and in which drawings:

FIGURE 3 is a sectional view taken on the line 3—3 of FIGURE 2;

FIGURES 5a and 5b are enlarged sectional views taken on line 5—5 of FIGURE 1, respectively showing the rear and front portions of the proofer;

FIGURE 6 is a sectional view taken on line 6—6 of FIGURE 3;

FIGURE 7 is a sectional view taken on line 7—7 of FIGURE 3;

Figure 1:
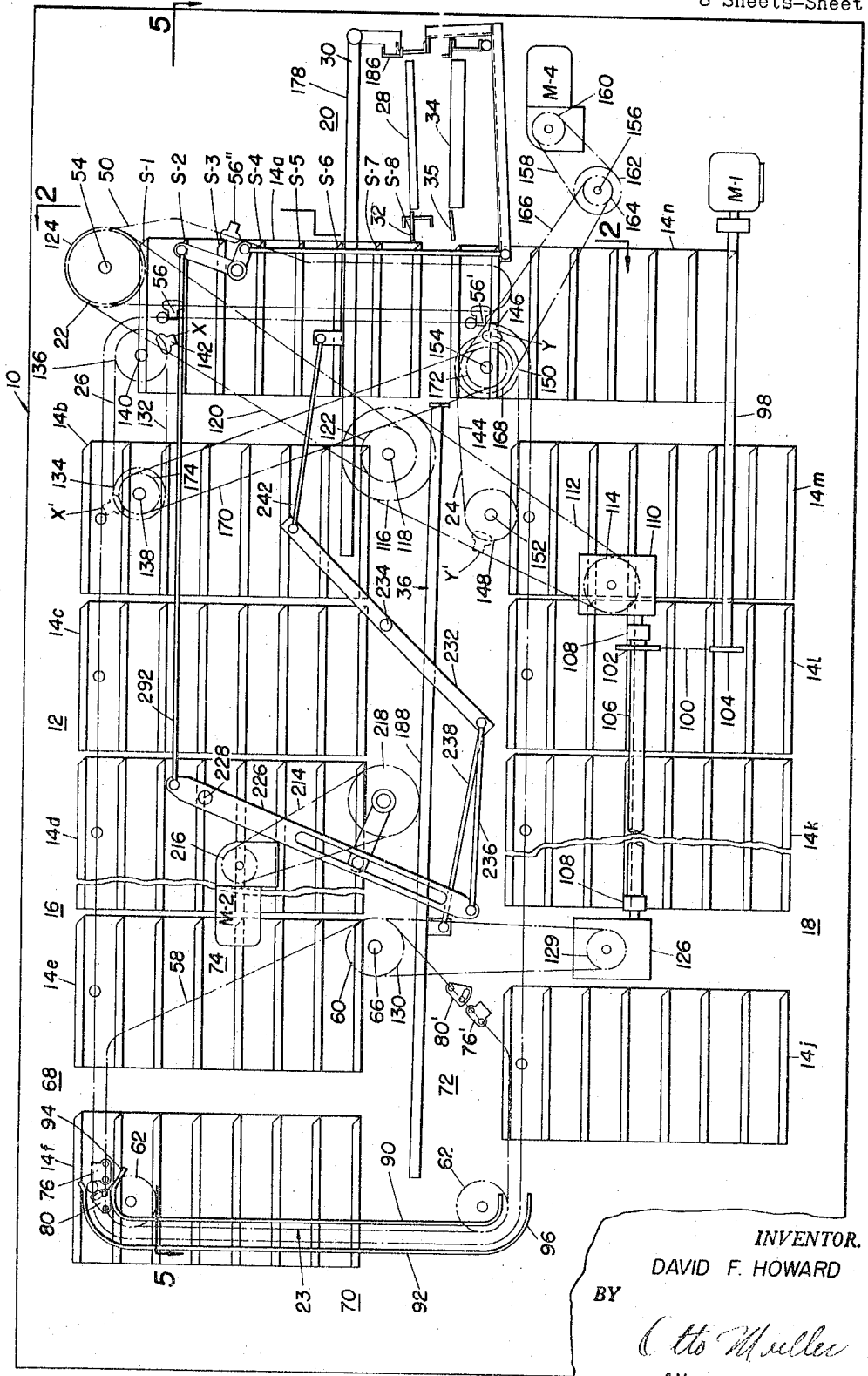
FIGURE 1 is a view in side elevation taken inside the proofer housing with the various elements contained therein shown more or less diagrammatically.

Referring particularly to FIGURE 1, my novel proofer comprises a generally rectangular elongated housing 10 defining a proofing chamber 12 through which racks 14, carrying pans of dough to be proofed, travel in an elongated closed loop having an upper horizontal run 16 and a lower horizontal run 18.

Figure 2:
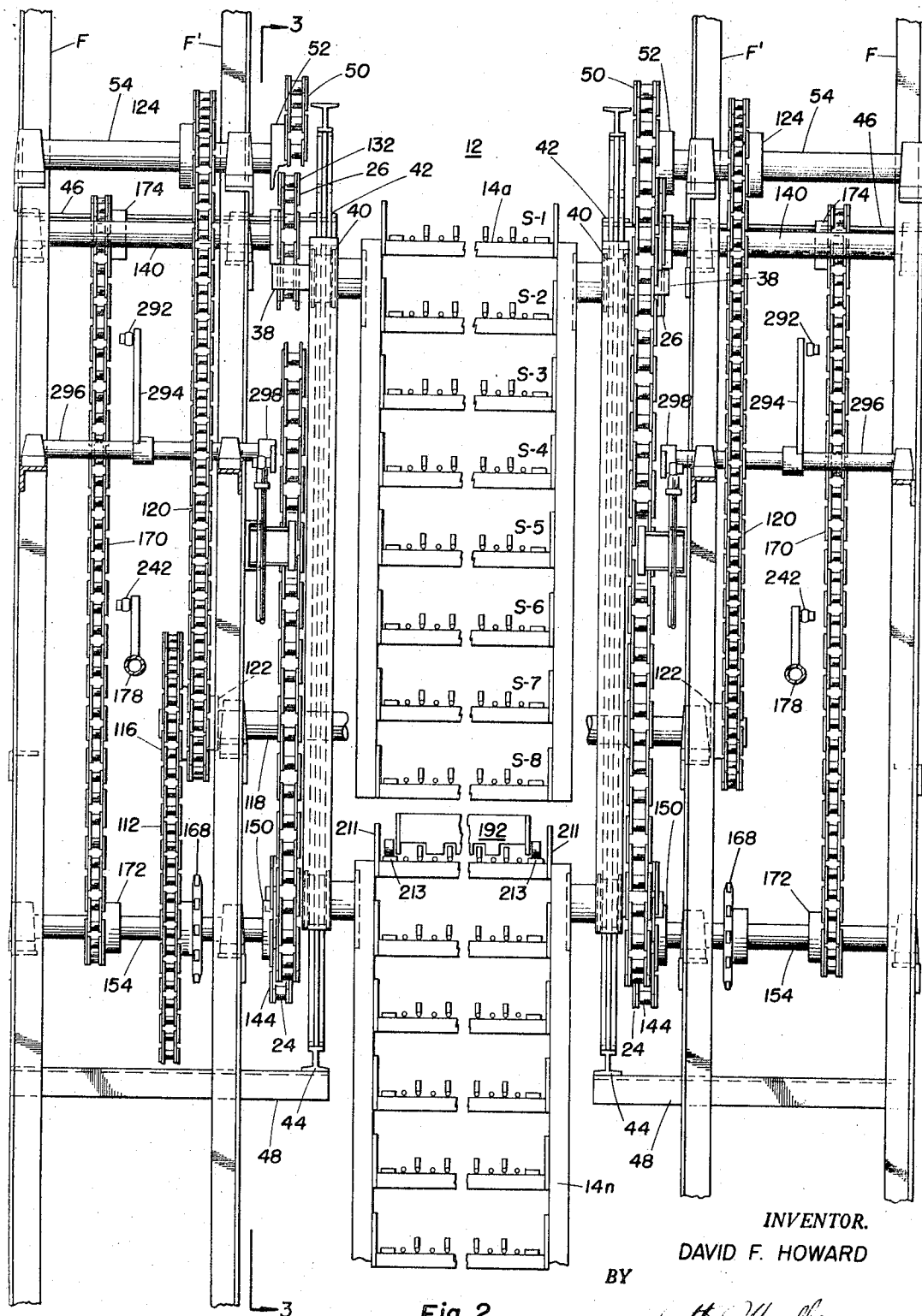
FIGURE 2 is an enlarged sectional view taken on the line 2—2 of FIGURE 1.
Figure 10:
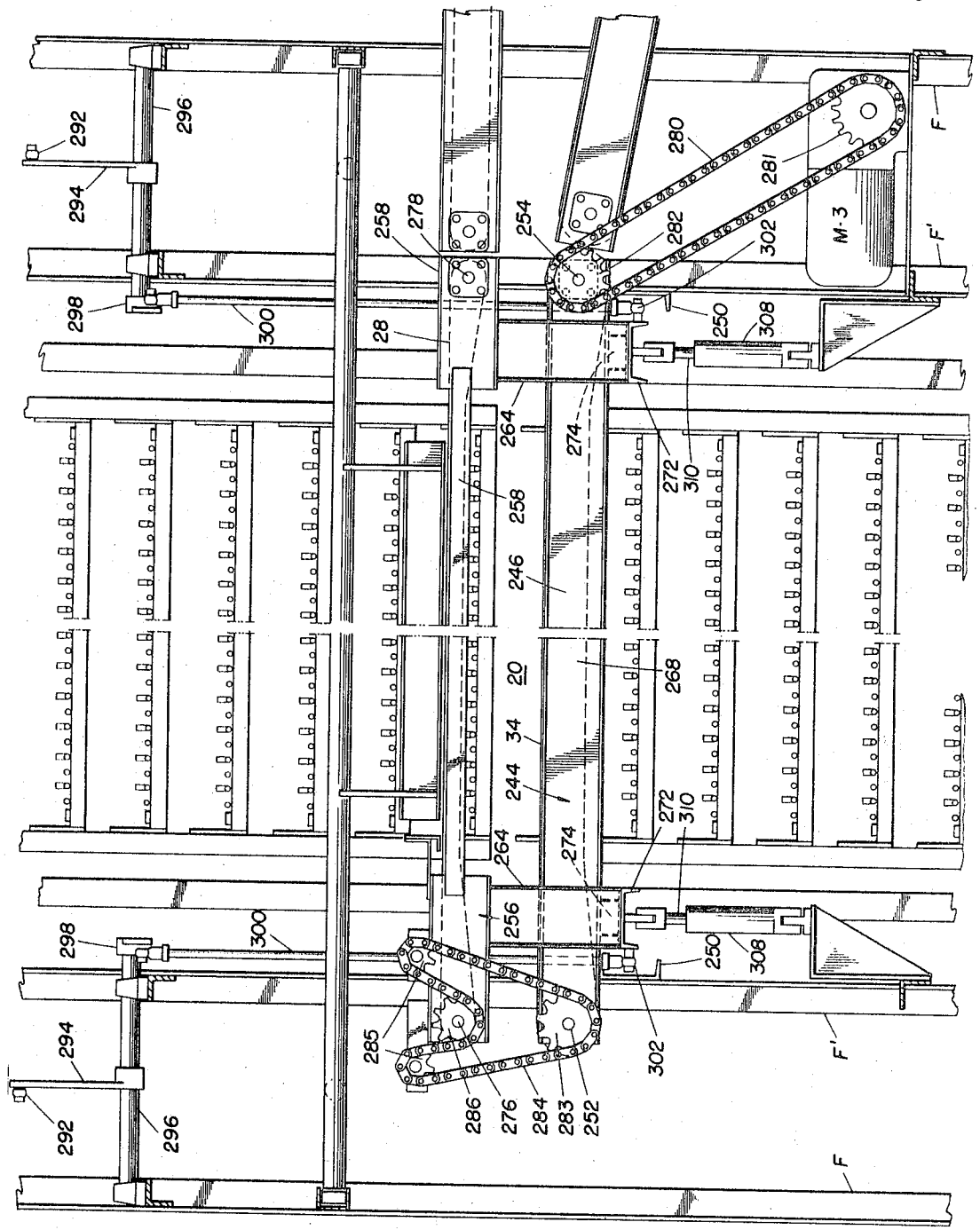
FIGURE 10 is a fragmentary front elevational view of the proofer mechanism.

The housing 10 is preferably in the form of a skelton framework made up of suitable vertical and horizontal inter-connected angle irons or other suitable structural elements enclosed by sheet metal panels or other suitable enclosing means. The enclosing means is not shown in the drawings in order to reveal the operating means within the housing 10. The skeleton framework includes at each side of the housing 10, outer and inner spaced frames F and F', as best shown in FIGURES 2 and 10. Air under such temperature and relative humidity suitable for the proofing of the dough is supplied to the proofing chamber 12 by suitable air conditioning means, not shown.

The racks 14 are in the form of an open rectangular framework having a plurality of equidistantly vertically spaced horizontal shelves, the whole being made up of metal bars, tubing or the like, the shelves being adapted to support a plurality of side by side dough pans 19.

The forward end of the proofing chamber 12 is arranged to provide a loading and unloading station 20, at which station successive rows of pans of unproofed dough are loaded onto successive shelves of the racks 14 and successive rows of pans of proofed dough are unloaded from successive shelves of the racks 14.

A continuously operating rack elevator, indicated generally by reference numeral 22, raises successive racks 14 through the loading and unloading station 20. Lowering means, indicated as a whole by reference nu meral 23, lowers successive racks 14 from upper horizontal run 16 to lower horizontal run 18. An intermittently operating rack advance conveyor 24 at the forward end of lower run 18 advances successive terminal racks 14 on lower run 18 to a position beneath a preceding rack 14 that is being elevated and in position to be picked up by the rack elevator 22. An intermittently operating rack discharge conveyor 26 at the forward end of upper run 16 picks up a rack 14 that has been elevated by the rack elevator 22, and discharges it along upper run 16 a distance and at a rate of speed to provide clearance for the succeeding rack that is being elevated. The details of construction and operation of the rack elevator, rack lowering means, rack advance conveyor and rack discharge conveyor will be hereinafter described with greater particularity.

A pair of vertically spaced endless conveyors extend transversely within the proofer housing, in the loading and unloading station 20, and are disposed a spaced distance forward of the path of a rack that is being elevated. These conveyors may be of any suitable type adapted for the conveyance of pans, and for purpose of illustration are shown as slat type conveyors of conventional construction. The upper conveyor 28, hereinafter referred to as the loading conveyor, conveys the pans of dough in the proofer to a position in front of a rack being elevated by the rack elevator 22, where pusher means, hereinafter referred to as the loading pusher 30, pushes successive groups of pans from the loading conveyor 28 across a transfer plate 32 onto successive shelves of a rack 14, as the rack is continuously elevated through the loading and unloading station 20. The lower conveyor 34, hereinafter referred to as the unloading conveyor, is adapted to convey laterally toward one side of the proofer housing, pans of proofed dough which have been pushed from successive shelves of a rack 14 across a transfer plate 35 onto the unloading conveyor 34 by pusher means, hereinafter referred to as the unloading pusher 36. The conveyors, transfer plates and associated means together with the operation of the same, is hereinafter described in detail.

*Racks*

The racks 14 are all identical in construction, so that in describing details of construction of any one particular rack, it will be understood that it applies in similar manner to all the racks. For purpose of individual identification of the racks, suffix letters *a, b, c*, etc., have been applied to the rack reference character 14. Referring particularly to FIGURE 1, rack 14a is shown as having eight equidistantly spaced shelves designated from top to bottom by the reference characters S–1 to S–8, inclusive. While for purpose of illustration the racks 14 are shown with eight shelves and the operation of the apparatus is described hereinafter in respect of racks with eight shelves, it will become apparent that the apparatus is readily adaptable to handle racks with a lesser or greater number of shelves.

As illustrative of all the racks 14, rack 14a, as best shown in FIGURES 2 and 5b, is provided at each lateral side with a laterally outwardly projecting stub shaft 38 carrying an outboard roller 40. The stub shafts 38 and rollers 40 carried thereby are disposed above the center of gravity of the rack 14a and located centrally between the front and rear sides of the rack. The outer ends of the stub shafts 38 projecting beyond the rollers 40 are adapted to be engaged by lugs carried by the rack elevator 22, the rack advance conveyor 24 and the rack discharge conveyor 26, and by latch and lug means carried by the rack lowering means 23, all as more particularly described hereinafter, for transporting the racks in the manner set forth above.

At opposite sides of the proofing chamber 12, extending longitudinally along upper run 16 are upper tracks 42, and extending longitudinally along lower run 18 are lower tracks 44. Referring particularly to FIGURE 2, upper and lower tracks 42 and 44 are supported, respectively, on upper brackets 46 and lower brackets 48, which brackets are rigidly secured to the inner frames F' of the housing framework and project inwardly thereof. The tracks 42 and 44 provide guide supports along which the rollers 40 are adapted to roll as the racks 14 are transported along the upper and lower runs 16 and 18.

*Rack elevator*

The rack elevator 22, which elevates the racks 14 through the loading and unloading station 20 as previously described, includes a pair of endless chains 50 disposed in parallel vertical laterally spaced planes sufficiently far apart to receive a rack 14 therebetween. The chains 50 are trained at their upper ends around sprockets 52 fixed on the inner ends of transversely extending stub shafts 54, which stub shafts are rotatably mounted in suitable bearings carried by outer and inner frames F and F' of the opposite sides of the housing 10, as may best be seen by referring to FIGURES 2 and 3. At their lower ends, the chains 50 are trained around shoes 54, suitably supported by inner frames F' of the opposite sides of the housing 10, it being understood that sprockets can be substituted for the shoes 54 if desired.

The lengths of the chains 50 are such as to carry three equidistantly spaced lugs 56, 56' and 56", with the distance between the lugs being equal to the distance between the top shelf S–1 and the bottom shelf S–8 of a rack plus one additional shelf space. The lugs 56, 56' and 56", in their travel along the ascending run of the chains 50 as indicated by the directional arrow in FIGURE 3, engage the rack stub shafts 38 to elevate successive racks 14. With the described arrangement of the chains 50 and lugs 56, 56' and 56", the distance between the bottom shelf of one rack and the top shelf of a succeeding rack, as the racks are elevated through the loading and unloading station 20, will be exactly one shelf space. This is an important feature since it permits simultaneous loading and unloading at all times of not only two succeeding shelves of a single rack but also the bottom shelf of one rack and the top shelf of a succeeding rack. The chains 50 are driven continuously and the means for driving them will be described in detail hereinafter.

*Rack lowering means*

As previously stated, the rack lowering means 23 lowers the racks 14 from the upper run 16 to the lower run 18 and includes a pair of endless chains 58 disposed in parallel vertical laterally spaced planes sufficiently far apart to receive a rack 14 therebetween. Referring particularly to FIGURE 1, there is shown a chain 58 at the left side of the proofer housing when viewed from the front. The chain 58 is trained around drive sprocket 60 and driven sprockets 62; the latter, as shown in FIGURE 5a being fixed on the inner ends of transversely extending stub shafts 64, which stub shafts are rotatably mounted in suitable bearings carried by outer and inner frames F and F' at the left side of the proofer housing. This chain, sprocket and stub shaft arrangement is duplicated at the opposite side of the proofer housing.

The drive sprockets 60 are fixed on a transverse through shaft 66 disposed in the space between the upper and lower row of racks 14, shaft 66 being journaled at its ends in suitable bearings carried by the framework of the opposite sides of the proofer housing. Thus, by rotating through shaft 66, as later described, both chains 58 are driven. The described sprocket and chain arrangement provides in the rack lowering means 23 a horizontal upper run 68 for moving successive racks rearwardly along upper tracks 42 into position to be lowered; a vertical descending run 70 for lowering successive racks to the lower tracks 44; a horizontal lower run 72 for moving successive racks forwardly along lower tracks 44; and a return run 74.

The chains 58 are each provided with a pair of radially outwardly projecting equidistantly spaced lugs 76 and 76', which lugs are adapted to engage the laterally outer end portions of the rack stub shafts 38 to move the racks along the upper and lower runs 68 and 72. The chains 58 are each additionally provided with a pair of pivotally mounted latch members 80 and 80' just ahead of the lugs 76 and 76'. The latch members 80 and 80' provide means for supporting the racks 14 along the descending run 70. Pivotal movement of the latch members 80 and 80' relative to the chains 58 is limited by reason of engagement of chain pin extensions 82 and 82' in slots 84 and 84' in the free end portion of the pivoted latch members 80 and 80', whereby the latch members 80 and 80' are movable between a retracted position out of the path of a rack stub shaft 38 and an extended position in the path of a rack stub shaft 38.

A guide plate 90 is provided along the descending run 70 of each of the chains 58 at the inner forward side thereof, and another guide plate 92 is provided at the outer rearward side thereof. The guide plates 90 and 92 are spaced apart a distance adapted to closely receive the rack rollers 40 therebetween to guide the racks during their descent. The inner guide plates 90 are also adapted to be engaged by the latch members 80 and 80' to retain them in extended position wherein they are adapted to be engaged by the rack stub shafts 38 and support the racks during their descent. The upper end portion of each of the inner guide plates 90 is provided with a curved cam section 94 adapted to engage a latch member 80, 80' to move it from retracted to extended position. The lower end portion of each of the outer guide plates 92 is provided with a curved rack roller guide 96 for guiding successive racks onto the lower tracks 44.

The chains 58 of the rack lowering means 23 are continuously driven in timed relation with the chains 50 of the rack elevator, as hereinafter described, so that as a rack is being elevated, another rack is being lowered at the opposite end of the proofer, the chains 58 traveling through a distance equal to the spacing between lugs 76 and 76' in the same time that chains 50 travel through a distance equal to the spacing between a pair of successive lugs 56, 56' and 56".

Rack elevator and rack lowering means drive

The rack elevator 22 and the rack lowering means 23 are operated from a single motive source, continuously operating gear head reduction motor M-1, whereby they operate in synchronized timed relation. The motor M-1 is mounted in the lower forward left side of the proofer, being suitably supported by the proofer housing framework between outer and inner frames F and F'. Motor M-1 drives a longitudinally extending torque tube 98 journaled in suitable bearings carried by the proofer housing framework between outer and inner frames F and F' at the left side of the proofer. The drive means includes a chain 100 trained around sprockets 102 and 104 fixed, respectively, on the forward end of a vertically offset longitudinally extending torque tube 106 and the rearward end of the torque tube 98. The forward end of the torque tube 106 is connected by a flexible coupling 108, with the input shaft of a speed reducing unit 110. A chain 112 is trained around a sprocket 114 fixed on the output shaft of speed reducing unit 110 and a sprocket 116 fixed on a transversely extending through shaft 118 suitably journaled in bearings carried by the framework at opposite sides of the proofer housing. A pair of chains 120 at opposite sides of the proofer are trained around sprockets 122 fixed on opposite ends of through shaft 118 and around sprockets 124 fixed on the stub shafts 54 of the previously described rack elevator 22 for operating the same.

The rearward end of the torque tube 106 is connected with the input shaft of a speed reducing unit 126. A chain 128 is trained around a sprocket 129 fixed on the output shaft of the speed reducing unit 126 and a sprocket 130 fixed on the through shaft 66 of the previously described rack lowering means 23 for operating the same.

Rack discharge conveyor

The rack discharge conveyor 26 is arranged to move successive racks from the upper end of the elevator chains 50 rearwardly along the upper tracks 42 to the position shown occupied by rack 14b in FIGURE 1. The rack discharge conveyor 26 includes a pair of endless chains 132 disposed in vertical longitudinal laterally spaced planes, each of the chains 132 being offset slightly outwardly of a respective elevator chain 50 for a reason hereinafter set forth, and as best shown in FIGURE 2. Referring particularly to FIGURE 1, showing the construction and arrangement of elements on the left side of the proofer, the chain 132 is trained around rearward drive sprocket 134 and forward driven sprocket 136. The sprocket 136 is so disposed that the chain 132, as it rounds the extreme forward peripheral portion of the sprocket 136, is spaced a distance rearward of the ascending run of the elevator chain 50 to freely permit rack stub shafts 38 to pass between the adjacent portions of the chains 50 and 132. The upper run of the chain 132 is disposed laterally outward of and slightly above the level of the upper track 42, and extends therealong a distance to move a rack from the rack elevator 22 to the position shown occupied by rack 14b in FIGURE 1.

The sprockets 134 and 136 are mounted on the inwardly projecting ends of stub shafts 138 and 140, respectively, which shafts are suitably journaled in bearings carried by the outer and inner frames F and F' of the housing framework. Rack discharge conveyor chain 132 carries a lug 142, which is arranged to engage the stub shaft 38 of a rack that has been elevated by the elevator chain 50; to lift the rack from a lug of the chain 50; and to then move the rack rearwardly along the track 42 to the position shown occupied by rack 14b. It will be understood that the various elements of the rack discharge conveyor 26, described above, are duplicated at the opposite side of the proofer housing 10.

As previously stated, each of the rack discharge conveyor chains 132 is offset slightly laterally of a respective rack elevator chain 50. The reason for this is to permit the lug elements of lugs 142, formed with the inner and outer links of chains 132, to clear the lug elements of lugs 56, 56' and 56", formed with the inner and outer links of chains 50, when a rack is lifted by the lugs 142 from the lugs 56, 56' and 56".

The chains 132 of the rack discharge conveyor 26 are driven intermittently in counterclockwise direction, as viewed in FIGURE 1, to move lugs 74 from full line position X, in readiness to pick up a rack, to phantom line rack release position X', and then from position X' to position X. The rack discharge conveyor is operated in timed relation, through means to be later described, with the rack elevator 22, so that when a rack has been elevated a part of a rack shelf space from the position shown occupied by rack 14a in FIGURE 1, or in other words, when the rack stub shaft 38 is in approximate horizontal axial alinement with the rack discharge conveyor shaft 140, operation of the rack discharge conveyor from position X is initiated. The rack discharge conveyor operates at a greater speed than the rack elevator, in the present instance approximately three times as fast, so that the lugs 142 overtake the lugs 56 and lift the rack 14a from the rack elevator 22, and also move the rack 14a a horizontal distance at least such that its lower trailing edge clears the leading upper edge of succeeding rack 14n that is being elevated. It is evident then, that the rack discharge conveyor lugs 142 push rack 14a along the upper tracks 42 to the position shown occupied by rack 14b, and in so doing, the rack 14a engages rack 14b to push it ahead to the position shown occupied by rack 14c. Consequently, all the racks 14 on upper run 16 will be pushed ahead one rack space.

Rack advance conveyor

The rack advance conveyor 24 moves successive racks along the lower tracks 44 from the position shown occupied by rack 14m to a position that is somewhat below the position of rack 14n in FIGURE 1, where it is in position to be picked up by the rack elevator 22.

As previously pointed out, the lugs 56, 56′ and 56″ of the elevator chains 50 are spaced a distance apart such that the bottom shelf of one rack and the top shelf of a succeeding rack, as the racks are elevated through the loading and unloading station 20, will be exactly one shelf space apart. Referring particularly to FIGURE 1, it is apparent that rack 14m (and this of course applies to all the racks when occupying the position of rack 14m) cannot be moved into position to be picked up by the rack elevator 22 until the preceding rack 14n has been elevated a distance to provide clearance thereunder for rack 14m. It is also apparent that because of the distance that the rack 14m must be moved at that time, to place it in position to be picked up by the oncoming lugs 56″ of the rack elevator chains 50, the rack advance conveyor 24 must travel at a considerably greater speed than the rack elevator 22, in the present instance about three times as fast. It is furthermore important that the rack advance conveyor 24 be operated in timed relation with the rack elevator 22, so that racks are presented by the rack advance conveyor 24 at the proper time to be picked up by the rack elevator 22.

The rack advance conveyor 24 includes a pair of endless chains 144 disposed in vertical longitudinal laterally spaced planes, each of the chains 144 being offset slightly laterally of a respective elevator chain 50, so that the lugs 56, 56′ and 56″ of the elevator chains 50 will clear the lugs 146 of the rack advance conveyor chains 144. Referring particularly to FIGURE 1 showing the construction and arrangement of elements on the left side of the proofer, the chain 144 is trained around rearward driven sprocket 148 and forward drive sprocket 150. The sprocket 150 is so disposed that the chain 144, as it rounds the extreme forward peripheral portion of the sprocket 150, is spaced a distance rearward of the ascending run of the elevator chain 50 to freely permit rack stub shafts 38 to pass between the adjacent portions of the chains 50 and 144. The lower run of the chain 144 is disposed above and slightly laterally outward of the lower track 44 and extends therealong a distance to move a rack from the position shown occupied by rack 14m to a position slightly below the position shown occupied by rack 14n.

The sprockets 148 and 150 are mounted on stub shafts 152 and 154, respectively, suitably journaled in bearings carried by the housing outer and inner frames F and F′. Rack advance conveyor chain 144 carries a lug 146, which is arranged to engage a rack stub shaft 38 for moving a rack in the manner set forth above. It will be understood that the various elements of the rack advance conveyor 24, described above, are duplicated at the opposite side of the proofer housing 10.

The chains 144 of the rack advance conveyor 24 are driven intermittently in counterclockwise direction, as viewed in FIGURE 1, to move lugs 146 from full line position Y, after a rack has been picked up by the rack elevator 22, to phantom line position Y′, and then from position Y′ to position Y to advance a rack in the manner previously set forth.

Rack advance conveyor 24 and rack discharge conveyor 26 are operated simultaneously by motor M-4, through drive means hereinafter described.

Rack advance and rack discharge conveyor drive means

Gear head reduction motor M-4 is conveniently mounted in one side of the housing 10 between outer and inner frames F and F′, the lower forward left side as shown in FIGURE 1, and is supported in suitable manner by the housing framework. A transversely extending through shaft 156, journaled at its ends in suitable bearings carried by the inner frames F′ of the opposite sides of the proofer housing, is driven by a chain 158 trained over sprockets 160 and 162 fixed, respectively, on the output shaft of motor M-4 and one end of through shaft 156. Secured on extensions of shaft 156 at opposite sides of the proofer housing between outer and inner frames F and F′, are sprockets 164. Chains 166 are trained over the sprockets 164 and over sprockets 168 fixed on the stub shafts 154 of the rack advance conveyor 24 for operating the same. Chains 170 are trained over sprockets 172 on the stub shafts 154 of the rack advance conveyor 24 and over sprockets 174 fixed on the stub shafts 138 of the rack discharge conveyor 26 for operating the same, as best shown in FIGURE 2.

Suitable timing means, hereinafter adverted to, operated in timed relation with rack elevator 22 is employed for controlling intermittent operation of the motor M-4 to operate the rack advance conveyor 24 and the rack discharge conveyor 26 in the manner previously described.

Loading pusher

The loading pusher 30, referring particularly to FIGURES 1 and 5b, includes a rectangular frame 176 comprising a pair of laterally spaced, longitudinally extending tubular frame members 178 at opposite sides of the racks 14, connected together at their forward ends by a transversely extending tubular frame member 180. Suitably supported by the framework at each side of the proofer are a pair of laterally spaced rearward concave rollers 182 and a pair of laterally spaced forward concave rollers 184. The longitudinal tubular frame members 178 are retained between the pairs of rearward and forward rollers 182 and 184, whereby the loading pusher 30 is freely movable in a longitudinal path. A pusher bar 186 is pendantly supported from transverse pusher frame member 180 and is adapted to sweep across the loading conveyor 28 and transfer plate 32 for pushing successive rows of pans of dough from the loading conveyor 28 onto successive rack shelves as the racks are continuously elevated through the loading and unloading station 20. Reciprocating intermittent movement is imparted to the loading pusher 30 by drive means hereinafter described, in timed relation with elevation of the rack elevator 22, as also hereinafter described.

Unloading Pusher

The unloading pusher 36 includes a rectangular frame 188 comprising a pair of laterally spaced, longitudinally extending frame members 190 disposed inwardly of and below the loading pusher side frame members 178, the frame members 190 being connected at their forward ends by a transversely extending pusher bar 192.

Figure 4:
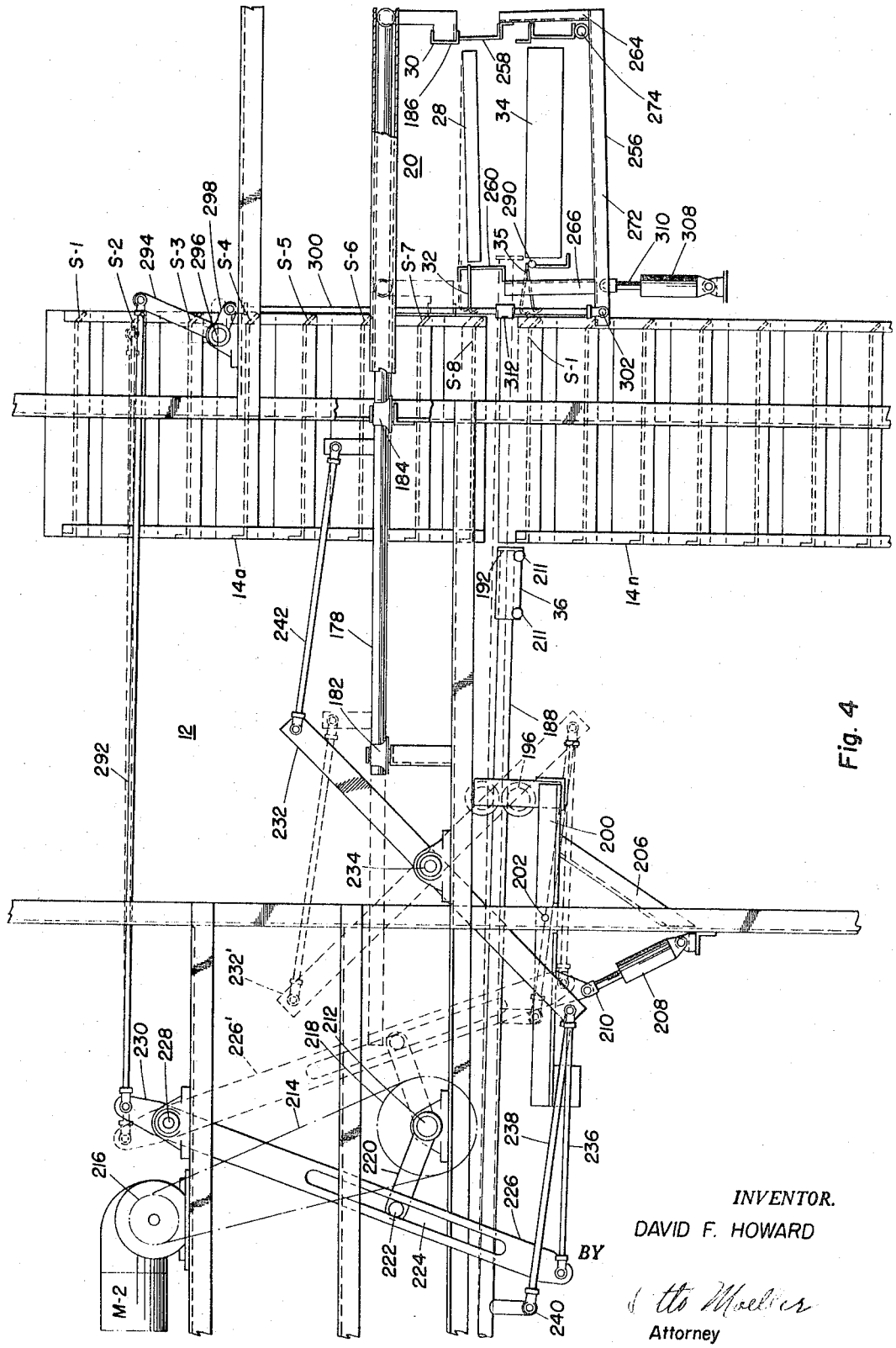
FIGURE 4 is an enlarged view in side elevation of a portion of FIGURE 1 showing in greater detail the loading and unloading means for transferring pans of dough to be proofed from the infeed conveyor onto successive shelves of a rack and for transferring pans of proofed dough from successive rack shelves onto the discharge conveyor.

Referring particularly to FIGURES 4, 5a and 5b, each of the longitudinal tubular frame members 190 is received between and supported by a pair of vertically spaced concave rearward rollers 194 and a pair of vertically spaced concave forward rollers 196, whereby the unloading pusher is freely movable in a longitudinal path.

By means hereinafter described, reciprocating intermittent movement is imparted to the unloading pusher 36, from a retracted rest position, as shown in FIGURES 4, 5a and 5b, to an extended position and back to its retracted position. On the extending stroke of the unloading pusher 36, the pusher bar 192 sweeps successive rows of pans of proofed dough from successive rack shelves across pivotally mounted transfer plate 35 onto the unloading conveyor 34, as the racks are continuously elevated through the loading and unloading station 20.

The pairs of rearward rollers 194 are suitably mounted on the inner ends of transversely extending brackets 198 secured to and extending inwardly of the inner frames F′ of the opposite sides of the housing 10. The pairs of forward rollers 196 are suitably mounted on the free ends of levers 200 which are pivotally mounted, as at 202, on brackets 204 secured to and extending inwardly of the inner frames F′ of the opposite sides of the housing 10. In the retracted position of the unloading pusher 36, downward swinging movement thereof is restrained by engagement of the free ends of the pivoted levers 200 with a transversely extending stop bar 206, the ends of which are suitably secured to inner frames F′ of the opposite sides of housing 10. When an upward force is applied to the forward end of the unloading pusher 36, as when the pusher bar 192, during its extending and retracting strokes, is traveling across a continuously ascending rack shelf, the unloading pusher 36 is free to swing upwardly about the pairs of rear rollers 194 as a fulcrum. When the upward force applied to the forward end of the unloading pusher 36 is relieved, as when the pusher bar 192 drops off the ascending rack shelf upon return of the unloading pusher 36 to its retracted position, the unloading pusher 36 is free to drop by gravity to its original position, as shown in FIGURE 1. Hydraulic cylinders 208 suitably mounted in the housing 10, having the free ends of their stems 210 connected with the pivotally mounted levers 200, dampen and retard dropping of the unloading pusher 36, to eliminate noise and possible injury to the equipment.

For reasons to be now explained, the above described means for supporting the unloading pusher 36 in its retracted position is arranged to retain it in such retracted position at a slight rear to front downwardly sloping angle, as best shown in FIGURES 1 and 4. Referring particularly to FIGURE 4, it will be seen that almost immediately upon initiation of operation of the unloading pusher 36, its forward end will rest on the surface of an ascending rack shelf. To facilitate movement of the pusher bar 192, it is provided at each side with longitudinally spaced rollers 211, adapted to run along tracks 213 of the rack shelves, as best shown in FIGURE 2. As the rack shelf ascends, the unloading pusher frame 188 is adapted to swing upwardly about rear rollers 194 as a fulcrum during traverse of the forward end of the pusher across the ascending shelf. By supporting the unloading pusher in a sloping position, as above described, fouling of the unloading pusher frame against the ascending rack shelf is avoided. The slope of the unloading pusher 36 is preferably such that it will be raised to a horizontal position by the ascending rack shelf when the pusher bar 192 reaches its extended position, so that the lower edge of the pusher bar 192 may be retained in close proximity to the ascending rack shelf during its pan pushing stroke. This is particularly important when proofing rolls or buns, since roll and bun pans are very shallow.

*Loading and unloading pusher operating means*

The loading and unloading pushers 30 and 36 are operated through novel linkage means from a single motive source, motor M-2, whereby pushers 30 and 36 are synchronously operated to simultaneously operate the pushers to load and unload two successive shelves of each rack as well as the bottom shelf of one rack and the top shelf of a succeeding rack on each extending or pushing stroke, and to simultaneously operate the pushers on their retracting stroke.

Gear head reduction motor M-2 is conveniently mounted between outer and inner frames F and F′ at one side of the housing 10, the left side as shown in FIGURE 1, rearward of the pusher assemblies. A transversely extending through shaft 212, FIGURES 4 and 5a, journaled at its ends in suitable bearings carried by inner frames F′ of the housing 10, is driven by chain 214 trained over sprockets 216 and 218 fixed, respectively, on the laterally inwardly projecting end of the motor shaft and on one end of through shaft 212, the chain 214 being disposed in the space between inner frame F′ and the side of the racks 14 on upper run 16. Secured on extensions of the shaft 212, between outer and inner frames F and F′ at each side of the housing 10, are radially extending crank arms 220.

Referring to the mechanism on the left side of the proofer, which is duplicated on the right side thereof, the free end of crank arm 220 carries a cam follower 222 engaging a cam groove 224 in a pusher operating arm 226. The pusher operating arm 226 is pivotally mounted at its upper end on a transverse stub shaft 228 journaled in suitable bearings carried by outer and inner frames F and F′, the stub shaft 228 and through shaft 212 being disposed in a common transverse vertical plane, with stub shaft 228 spaced above the through shaft 212. For a purpose later described, pusher operating arm 226 is provided at its upper end with a short extension 230 projecting upwardly beyond the pivotal mounting of pusher operating arm 226 on stub shaft 228.

Timing means, hereinafter described, operated in timed relation with rack elevator 22, is employed for controlling intermittent operation of the motor M-2 so that crank arm 226 makes one complete revolution during each elevation of a rack through one shelf space, however, for reasons that will become apparent, the crank arm 226 makes one complete revolution for each travel of the rack elevator 22 through a minor portion of a rack shelf space.

A second pair of pusher operating arms 232 are secured intermediate their ends on stub shafts 234 between outer and inner frames F and F′ at opposite sides of the housing 10, the shafts 234 being disposed in horizontal axial alinement with and spaced forward of the through shaft 212. Suitable bearings, carried by outer and inner frames F and F′, are provided for the stub shafts 234. Tie rods 236 are universally connected at their respective ends with the lower ends of the pusher operating arms 226 and 232. Through the above described linkage, it will be seen that for each complete revolution of the crank arms 220, the pusher operating arms 226 and their extensions 230 will move from their full line position, shown in FIGURE 4, to their broken line position designated 226′ and 230′, and return to their full line position, while pusher operating arms 232 will move from their full line position to their broken line position designated 232′, and return to their full line position.

Tie rods 238 pivotally connect the lower ends of the pusher operating arms 232 with the opposite ends of a transversely extending bar 240 which is rigidly secured inwardly of its ends to the rearward end of the unloading pusher frame 188, and tie rods 242 pivotally connect the upper ends of the pusher operating arms 232 with the loading pusher frame 176 intermediate its ends. The swing of the pusher operating arms 226 and 232 between their full and broken line positions is such that unloading pusher bar 192 and loading pusher bar 186 reciprocate between their full line and dotted line positions, as shown in FIGURE 4, for unloading and loading pans in the manner previously described.

*Loading and unloading conveyors*

The loading and unloading conveyors 28 and 34 are mounted in the loading and unloading station 20 forward of and in spaced relation with respect to the path of a rack being elevated, as previously described. The lower or unloading conveyor 34 is supported by a frame 244, FIGURE 3, including a pair of transversely extending spaced parallel front and rear frame members 246 and 248 rigidly mounted on longitudinally extending channels 250 which, in turn, are rigidly secured to inner frames F′ at opposite sides of the proofer housing. The endless conveyor 34, FIGURE 10, extends around shafts 252 and 254 at opposite ends of the frame 244, the shafts 252 and 254 being journaled in suitable bearings carried by frame members 246 and 248.

The upper or loading conveyor 28 is supported by a box-like frame 256, including a pair of transversely extending spaced parallel front and rear frame members 258 and 260 inter-connected near their ends by suitable cross bars, not shown. Rigidly secured to the front frame member 258 adjacent the ends thereof are depending frame elements 264 that project below the level of the front frame member 246 of unloading conveyor frame 244 and that are disposed forward thereof to clear the same. Similarly, secured to the rear frame member 260 adjacent the ends thereof are depending frame elements 266 that project below the level of the rear frame member 248 of unloading conveyor frame 244 and that are disposed rearward thereof to clear the same. The lower ends of the depending frame elements 264 and 266 are rigidly interconnected by transversely extending front and rear frame members, not shown, and cross bars 272.

The cross bars 272 are pivotally connected adjacent their forward ends to the under side of the front frame member 246 of the unloading conveyor frame 244, as indicated at 274, for swinging movement about a horizontal transverse axis, whereby the box-like loading conveyor frame 256 is adapted for vertical swinging movement about a horizontal transverse axis adjacent its lower forward end. Means, to be described, is provided for limiting swinging movement of the loading conveyor frame between a horizontal and a slightly rearwardly and downwardly sloping position. The endless loading conveyor 28 extends around shafts 276 and 278 at opposite ends of the frame 256, the shafts 276 and 278 being journaled in suitable bearings carried by front and rear frame members 258 and 260 of the box-like frame 256.

*Endless loading and unloading conveyor operating means*

The endless loading and unloading conveyors 28 and 34 are operated by a reduction gear head motor M-3 disposed in the lower forward right side of the housing 10. The drive means includes a sprocket chain 280 trained over sprocket 281 on the output shaft of motor M-3, and sprocket 282 on conveyor shaft 254, as best shown in FIGURE 10. Power is transmitted through endless conveyor 34 to shaft 252 on which is mounted sprocket 283. A sprocket chain 284 is trained over sprocket 283, idler sprockets 285 and sprocket 286, the latter being mounted on conveyor drive shaft 276 for operating the endless loading conveyor 28. For reasons hereinafter described in detail, the top runs of the endless loading and unloading conveyors 28 and 34 are spaced apart an appreciable distance greater than a rack shelf space.

The endless loading and unloading conveyors 28 and 34 are arranged to be operated intermittently, once for each elevation of a rack 14 by rack elevator 22 through one shelf space and more specifically during that interval when the loading and unloading pushers 30 and 36 are in their retracted or rest position. Assuming for purpose of illustration that a rack is elevated through a shelf space in three minutes, then during a portion of that three minute interval, for example one minute, the pushers 30 and 36 move through their extending and retracting strokes while the conveyors 28 and 34 are immobilized, and during the remaining two minutes the pushers 30 and 36 are immobilized while the conveyors 28 and 34 are actuated and arranged to travel a linear distance sufficient to respectively introduce a row of pans into the proofer in position to be pushed onto the shelf of a rack and to discharge a row of pans delivered thereto from a rack shelf. The means for controlling and timing the operation of the loading and unloading conveyors 28 and 34 will be hereinafter described.

*Pivoted loading conveyor frame and associated transfer plate and pivoted unloading conveyor transfer plate and operating means therefor*

Since the rack elevator 22 continuously raises the racks 14 through the loading and unloading station 20, provision is made for insuring ample product clearance and smooth transfer of pans, as they are pushed from the rack shelves onto the unloading conveyor 34 and from the loading conveyor 28 onto the rack shelves. The means for accomplishing this will now be described.

The previously referred to transfer plate 32 has a transverse extent substantially equal to the width of a rack 14, and is rigidly secured adjacent its forward edge to the rear frame member 260 of the box-like frame 256 so that its top surface is coplanar with the supporting surface of the endless loading conveyor 28. The longitudinal extent of the transfer plate 32 is such as to fill the space or gap between the endless loading conveyor 28 and the path of a rack being elevated, with the free or rearward edge of the transfer plate terminating closely adjacent the front of a rack 14.

The previously referred to transfer plate 35 also has a transverse extent substantially equal to the width of a rack 14, and is pivotally connected, as at 290, see FIGURES 3 and 6, adjacent its forward edge to the rear frame member 248 of the unloading conveyor frame 244 so that its top surface when in horizontal position is co-planar with the supporting surface of the endless unloading conveyor 34. The longitudinal extent of the pivotal transfer plate 35 is such as to fill the space or gap between the endless unloading conveyor 34 and the path of a rack being elevated, with the free or rearward edge of the transfer plate terminating closely adjacent the front of a rack 14.

Figure 8:
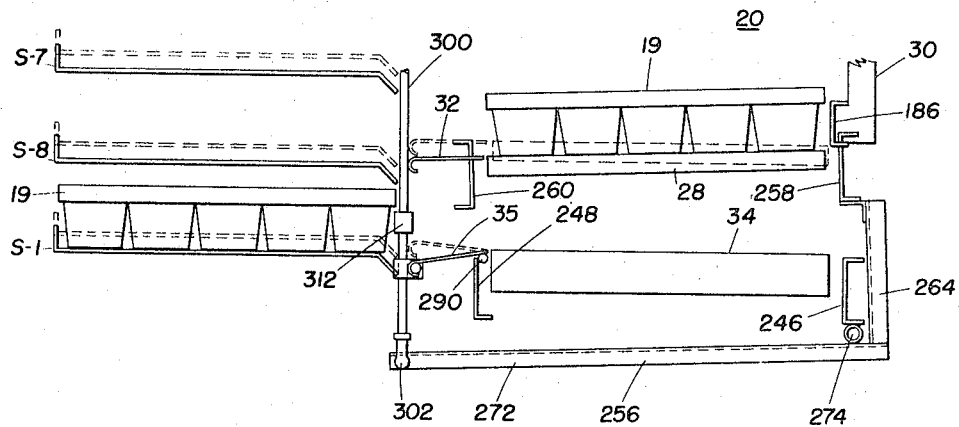
FIGURE 8 is a fragmentary diagrammatic view showing the relative positions of the infeed and discharge supports for the pans and the shelves of the racks.

The endless loading conveyor 28 and its associated transfer plate 32 is arranged to be intermittently oscillated between its full line downwardly and rearwardly sloping position and its phantom line horizontal position, and the transfer plate 35 is arranged to be intermittently oscillated between its full line downwardly and rearwardly sloping position and its phantom line upwardly and rearwardly sloping position, as best shown in FIGURE 8. The loading conveyor 28 and its associated plate 32, and the plate 35 are operated by the previously described pusher operating means, so that they are operated in timed relation with the pushers, and since as previously set forth the pushers are operated in timed relation with the rack elevator, it follows that the loading conveyor 28 and its associated plate 32, and the plate 35 are also operated in timed relation with the rack elevator, all as more fully described hereinafter.

The means for oscillating the loading conveyor 28 and its associated plate 32, and the plate 35, includes a pair of longitudinally extending operating rods 292 in opposite sides of the proofer housing 10, pivotally connected at their rearward ends to the upper ends of the extensions 230 of the pusher operating arms 226. An upright arm 294 is pivotally connected at its upper end to the forward end of each of the operaing rods 292, and at their lower ends each of the upright arms 294 is rigidly connected to a transverse stub shaft 296. Each of the stub shafts 296 is journaled at its ends in suitable bearings carried by outer and inner frames F and F' of the housing framework. Rigidly secured on an inwardly projecting extension of each of the stub shafts 296, between the side of a rack on the elevator 22 and the adjacent inner frame F' of the housing framework, is a longitudinally forwardly extending arm 298; the arm 294, shaft 296 and arm 298, at each side of the proofer, forming a bell crank assembly, as best shown in FIGURE 4. Depending from and pivotally connecting to the free end of each of the bell crank arms 298 is an operating rod 300. The above described elements being so arranged that the depending operating rods 300 are disposed in close proximity to opposite sides of a rack on the elevator 22 and adjacent the forward end of such rack, as best shown in FIGURES 3 and 10.

The lower cross bars 272 of the box-like frame 256 are spaced apart a distance somewhat greater than the width of a rack 14 and are at their rearmost ends, pivotally connected, as at 302, see FIGURES 3 and 7, to the lowermost ends of the operating rods 300. The pivoted transfer plate 35 is provided at its free edge with short rearward extensions 304 spaced laterally apart a distance somewhat greater than the width of a rack 14 and are pivotally connected, as at 306, to the operating rods 300, as best shown in FIGURE 6. The above described linkage connecting the pusher operating arm extension 230 and the pivoted transfer plate 35 is arranged to swing the plate 35 from its solid line to its phantom line position as the unloading pusher 36 moves from its retracted to its extended position, with the free edge of the plate 35 moving upwardly at a slightly faster rate of speed than the racks are elevated by the rack elevator 22. Simultaneously, the linkage is arranged to swing the loading conveyor 28 and its transfer plate 32 from its solid line to its phantom line position as the loading pusher 30 moves from its retracted to its extended position, with the free edge of the plate 32 moving upwardly at the same rate of speed that the racks are elevated by the rack elevator 22.

Assume for purpose of illustration that the rack shelves are spaced apart 8 inches. As previously described, the unloading pusher 36 moves through an extending and retracting stroke while a rack is raised by the elevator through a minor portion of a rack shelf space. For example, the unloading pusher 36 may move from its retracted to its extended position while a shelf of a rack is raised 1½ inches. As previously set forth, the unloading pusher 36 operates in timed relation with the rack elevator 22, the timing means being such that the unloading pusher starts its extending stroke when a rack shelf is slightly above the free edge of the pivoted transfer plate 35, preferably ½ inch. This is important since, because of manufacturing difficulties, warpage in service, or for other reasons, it is impossible to maintain an exact spacing of 8 inches between successive shelves of all the racks of the proofer. Consequently when a malformed shelf is in position to be unloaded, the possibility of a pan jamming against the free edge of the pivoted transfer plate 35 is rendered negligible.

As above set forth, the shelf of a rack moves upwardly 1½ inches while the unloading pusher moves from its retracted to its extended position. However, the previously described linkage between the pusher operating means and the pivoted transfer plate 35 is such that the free edge of the pivoted transfer plate 35 will during that same interval be raised a greater distance than the rack shelf, preferably 2 inches. Thus, with the free edge of the pivoted transfer plate 35 approximately ½ inch below the shelf of a rack at the start of the pushing stroke of the unloading pusher 36, it will gradually overtake the rack shelf, so that toward the end of the pushing stroke of the unloading pusher 36 when the trailing edge of a pan moves from the rack shelf onto the pivoted transfer plate 35, the drop of the trailing end of the pan will be negligible, thereby insuring against injury to the sensitive proofed dough in the pan during transfer thereof. This is an important feature.

Referring now to the loading conveyor 28 and its transfer plate 32, and particularly to FIGURE 8, the loading conveyor 28 and its transfer plate 32 is arranged so that the free edge of the transfer plate 32 is slightly, preferably ½ inch, above the level of the rack shelf S–8 at the start of the pushing stroke of the loading pusher 30. This renders negligible the possibility of the leading edge of a pan jamming against a malformed rack shelf as the pan is pushed onto the rack shelf. With all conditions being as shown in FIGURE 8, it is impractical to have the forward edge of the transfer plate 32 much more than ½ inch above the level of the shelf S–8, since then the upper leading edge of the pan being transferred will foul against the lower forward edge of the shelf S–7, thus limiting product clearance. If the spacing of the rack shelves were increased to provide the desired product clearance, this would, considering the number of shelves in the vertical run, unduly increase the overall height of the proofer. With this limitation on the location of the free edge of the transfer plate 32 at the start of the pushing strokes of the pushers, it will be seen that should it remain stationary as the rack shelf S–8 is being elevated, the top of the proofed dough in the pan, as its trailing edge aproaches the forward end of the shelf S–1 of rack 14n, will foul against the lower rearward edge of the loading conveyor 28. In order to meet all these conditions, the loading conveyor 28 and its transfer plate 32 are arranged to swing upwardly, as previously described, from the full line position to the phantom line position of FIGURE 8, as the rack shelves move upwardly and as the pushers move through their extending strokes.

In the drawings, the loading conveyor 28 is shown with its foremost transverse end spaced a substantial distance greater than a shelf space above the unloading conveyor 34. In the specific example set forth above, this distance is 9½ inches, so that during the extending stroke of the loading pusher 30, the loading conveyor 28 and its transfer plate 32 will swing from a downwardly and rearwardly sloping position to a horizontal position. It is apparent, however, that this distance can be made equal to a rack shelf space, or 8 inches, in which case the loading conveyor 28 and its transfer plate 32 will swing from a horizontal to a forwardly and upwardly sloping position. The primary reason for the greater than a shelf space distance is to provide greater access clearance for purpose of cleaning.

On the retracting stroke of the loading pusher 30, the loading conveyor 28 returns from its horizontal to its downwardly sloping position, at which time, as previously described, the loading conveyor operates to bring in another row of pans of dough. It is desirable, however, during operation of the loading conveyor 28, to have it disposed in a horizontal plane. For this purpose, a solenoid operated hydraulic cylinder 308 is energized simultaneously with initiation of operation of the loading conveyor 28, the stem 307 of the cylinder 308 being pivotally connected with the loading conveyor frame 256 to swing it upwardly about its pivotal mounting 274 and bring the loading conveyor 28 back to horizontal position. A lost motion connection 309, see FIGURE 7, in the operating rod 300 permits such movement of the loading conveyor frame 256. When the loading conveyor 28 stops, the solenoid operated cylinder 308 is de-energized, so that the frame 176 and the loading conveyor 28 swings downwardly by gravity to its downwardly sloping position, ready for the next pushing stroke of the loading pusher 30.

*Operation*

Figure 9:
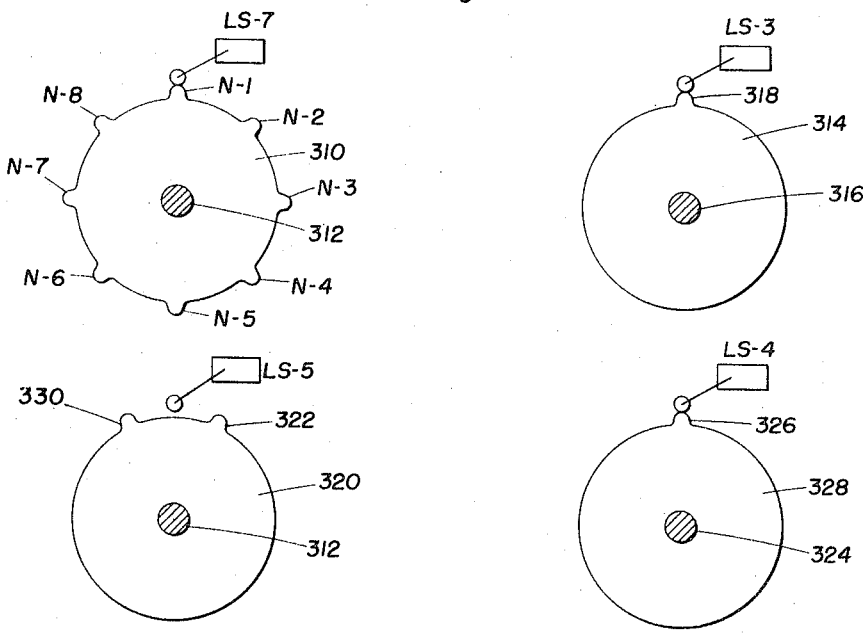
FIGURE 9 is a diagrammatic view showing the relative positions of the controls for synchronizing the operation of the various elements of the proofer.

The operation of the proofer will now be described with reference to the various elements thereof shown in their full line positions throughout the various figures. At this time rack shelf S–1 of rack 14n is slightly above, ½ inch in the specific example described above, the free edge of the downwardly sloping pivoted transfer plate 35, and rack shelf S–8 of rack 14a is slightly below, ½ inch in the specific example described above, the free edge of the downwardly sloping transfer plate 32. Referring particularly to FIGURE 9, a cam disc 310, having eight equidistantly spaced nodes N–1 through N–8, is mounted on a shaft 312 that is operated in timed relation with the rack elevator 22 to rotate the cam disc 310 through one node space for each elevation of a rack through one shelf space. Thus, shaft 312 makes one revolution for each travel of the rack elevator through a distance equal to the distance between two successive rack engaging lugs of the rack elevator, as for example, the distance between lugs 56 and 56′, which distance, as previously pointed out, equals the distance between the top and bottom shelf of a rack plus one additional rack shelf space. When rack shelf S–1 of rack 14n reaches the position shown in FIGURE 8, node N–1 of cam disc 310 closes a normally open switch LS–7 thereby completing a circuit to motor M–2 causing the pushers 30 and 36 to start on their pushing stroke. As soon as the pushers start, a normally closed switch LS–2, FIGURE 3, but which is held open in the retracted position of the loading pusher 30, will close to complete a holding circuit to the motor M–2, whereby the pushers will continue to operate when node N–1 of cam disc 310 runs off switch LS–7 causing the switch LS–7 to re-open.

As the pushers 36 and 30 move through their extending strokes, the pivoted transfer plate 35 and the loading conveyor 28 together with its transfer plate 32 swing upwardly from their full line to their phantom line positions, in the manner and through the means previously described, whereby to provide a smooth transfer of a row of pans of proofed dough from shelf S–1 of rack 14n onto unloading conveyor 34, and a row of pans of unproofed dough from loading conveyor 28 onto shelf S–8 of rack 14a. On the retracting strokes of the pushers 36 and 30, the pivoted transfer plate 35 and the loading conveyor 28 together with its transfer plate 32 return to their downwardly sloping positions, as previously described. When the pushers 36 and 30 reach their retracted position, loading pusher 30 again engages and opens normally closed switch LS–2, thereby breaking the holding circuit to motor M–2 to interrupt operation of the pushers 36 and 30. At the same time, switch LS–2 momentarily closes a drop out circuit to motor M–3 to initiate operation of the loading and unloading conveyors 28 and 34. A cam disc 314 is mounted on a shaft 316 operatively connected to motor M–3 to make one revolution for a linear travel of the loading and unloading conveyors 28 and 34 to bring in a new row of pans of dough into position to be loaded and to remove from in front of the rack the row of pans of proofed dough that has been unloaded. Upon initiation of operation of the motor M–3, it will be observed that node 318 of cam disc 314 rides off normally closed switch LS–3, thereby completing a circuit to the motor M–3 upon re-opening of the momentarily closed drop out circuit, whereby the loading and unloading conveyors 28 and 34 will make the aforesaid linear travel. Upon completion of this linear travel, the cam disc 314 will have completed one revolution, whereupon node 318 will engage switch LS–3 to open the circuit to and stop motor M–3. The speed of the loading and unloading conveyors is preferably such that they complete their linear travel an appreciable interval before the rack has completed its one shelf space elevation. The sequence of events thus far described are repeated for each elevation of a rack through one shelf space.

When racks 14a and 14n have been elevated part of a rack shelf space from their positions as shown in FIGURE 8, at which time the pushers have completed their extending and retracting strokes, operation of the rack discharge conveyor 26 and the rack advance conveyor 24 is simultaneously initiated to move lug 142 on a rack engaging run from position X to position X′ and to move lug 146 on a dry or empty run from position Y to position Y′, all as previously described. Initiation of such operation of the rack discharge and advance conveyors is controlled by a cam disc 320 mounted on shaft 312, which as before stated, makes one revolution while the rack is elevated through eight rack shelf spaces. Disc 320 is provided with a node 322, disposed thereon to engage normally open switch LS–5 when the rack 14a has been elevated a part of a rack shelf space from the full line position as shown in the several figures, or as previously described, when the rack stub shaft 38 of rack 14a is in approximate horizontal axial alinement with the rack discharge conveyor shaft 140. Engagement of node 322 with switch LS–5 completes a circuit to and starts motor M–4. Operated in timed relation with motor M–4 is a shaft 324 arranged to make one revolution while the lugs 142 and 156 move from their positions X and Y to positions X′ and Y′. The rack discharge and advance conveyors 26 and 24 are arranged to be operated at a speed such that their lugs 142 and 146 reach their X′ and Y′ positions when the elevator has completed its rack shelf space travel.

When motor M–4 starts, a node 326 on a cam disc 328 that is fixed on shaft 324, rides off normally closed switch LS–4, thereby completing a circuit to and maintaining motor M–4 energized when node 322 of cam disc 320 rides off normally open switch LS–5. When cam disc 328 completes its one revolution, node 326 will again engage and open switch LS–4, breaking the circuit to and stopping motor M–4, with the lugs 142 and 146 in their X′ and Y′ positions. The rack discharge and advance conveyor now remain in their last position as the rack 14n is continuously raised through the loading and unloading station and the shelves of the rack are loaded and unloaded in the manner previously described.

Now, when rack 14n has been elevated by rack elevator lug 56′ to a position wherein its lowermost shelf S–8 is being unloaded, and preferably before the pushers 30 and 36 have completed their retracting stroke, a node 330 on cam disc 320 engages and closes normally open switch LS–5, thereby completing a circuit to and again starting motor M–4. As soon as motor M–4 starts, node 326 of cam disc 328 will again ride off normally closed switch LS–4 to complete a circuit to and maintain motor M–4 energized when node 330 of cam disc 320 rides off normally open switch LS–5. When cam disc 328 completes its one revolution, node 326 will again engage and open switch LS–4, breaking the circuit to and stopping motor M–4, with the lugs 142 and 146, in their X and Y positions. During this last operation of the motor M–4, it will be seen that lug 142 has made a dry or empty run from position X′ to position X in readiness for discharging the rack 14n, and lug 146 has made a rack advancing run from position Y′ to position Y to bring rack 14m in position to be picked up by rack elevator lug 56″ and to be raised to the position shown occupied by rack 14n. This completes a cycle of events, and a new cycle is ready to begin While the invention has been described with particular reference to a dough proofer, it will be apparent that it is adapted for use as a bread cooler, or for treatment of other products in a treating chamber.

I claim:
1. In an article handling apparatus,
   a plurality of article carriers,
   means for conducting a succession of carriers in a closed loop including a carrier elevating means,
   an article receiving support in longitudinal spaced relation with respect to the path of an article carrier on said elevating means,
   a vertically swingable transfer plate pivotally connected to said article support and extending therefrom to said carrier path,
   pusher means,
   means for intermittently operating said pusher means through an extending and retracting stroke for sweeping articles on said extending stroke from successive carriers across said transfer plate onto said article support,
   linkage means associated with said pusher means for supporting said pivotal transfer plate in a downwardly sloping position in the retracted position of said pusher means and for pivotally raising said pivotal transfer plate on the extending stroke of said pusher means and lowering said pivotal transfer plate on the retracting stroke of said pusher means, and
   control means operated in timed relation with said carrier conducting means for initiating operation of said pusher means and said pivotal transfer plate when a carrier is elevated to a position between the free edge of said pivotal transfer plate and the plane of said article support.
2. An article handling apparatus in accordance with claim 1, wherein said linkage means is arranged to raise the free end of said pivotal transfer plate in overtaking relation with an article carrier.
3. In an article handling apparatus,
   a plurality of article carriers, means for conducting a succession of carriers in a closed loop including upper and lower runs and an elevating conveyor at one end of said runs for elevating successive carriers in equidistant spaced relation, a loading and an unloading article support in forward spaced relation with respect to the path of the carriers being elevated, said article supports being spaced a vertical distance apart not less than the spacing between a pair of successive carriers, a transfer plate fixed to said loading article support and extending therefrom to said carrier path, a vertically swingable transfer plate pivotally connected to said unloading article support and extending therefrom to said carrier path, pusher means associated with each of said article supports, means for intermittently operating said pusher means through an extending and retracting stroke for sweeping articles on said extending stroke from said loading support across said fixed transfer plate onto a carrier and from a carrier across said pivotal transfer plate onto said unloading support, linkage means associated with said pusher means for supporting said pivotal transfer plate in a downwardly sloping position in the retracted position of said pusher means and for pivotally raising said pivotal transfer plate on the extending stroke of said pusher means and lowering said pivotal transfer plate on the retracting stroke of said pusher means, and control means operated in timed relation with said carrier elevating means for initiating operation of said pusher means and said pivotal transfer plate when a carrier is elevated to a position slightly above the free edge of said pivotal transfer plate.

4. An article handling apparatus in accordance with claim 3, wherein said linkage means is arranged to raise the free end of said pivotal transfer plate in overtaking relation with an article carrier.

5. In an article handling apparatus, a plurality of article carriers, means for conducting a succession of carriers in a closed loop including elevating means for elevating successive carriers in equidistant spaced relation, means for continuously operating said elevating means, a loading and an unloading article support in frontal spaced relation with respect to the path of said carriers on said elevating means, said supports being spaced a vertical distance apart equal at least to the spacing between a pair of successive article carriers, a transfer plate fixed to said loading article support and extending therefrom to said carrier path, means pivotally supporting said loading article support, a vertically swingable transfer plate pivotally connected to said unloading article support and extending therefrom to said carrier path, pusher means associated with each of said article supports, means for intermittently operating said pusher means through an extending and retracting stroke for sweeping articles on said extending strokes from said loading support across said fixed transfer plate onto a carrier and from a carrier across said pivotal transfer plate onto said unloading support, and means for pivotally raising said pivotal transfer plate from a downwardly sloping position to raise the free edge thereof in closely following relation with successive carriers and simultaneously pivotally raising said loading article support to raise the free edge of said fixed transfer plate in closely leading relation with successive carriers, on each extending stroke of said pusher means.

6. In a rack type proofer, means for conducting a succession of racks in a closed loop including a rack elevator, means for continuously operating said rack elevator, said racks having a plurality of superimposed equidistantly spaced shelves, a loading and an unloading article supporting surface in front of and spaced from said rack elevator, said supporting surfaces being spaced a vertical distance apart equal at least to the spacing between a pair of successive rack shelves, a vertically swingable transfer plate pivotally mounted adjacent said unloading supporting surface and extending therefrom to the path of a rack on said elevator, pusher means associated with each of said article supporting surfaces, means for intermittently operating said pusher means through an extending and retracting stroke for sweeping articles on said extending stroke from said loading supporting surface onto a rack shelf and from a rack shelf across said pivotal transfer plate onto said unloading supporting surface, linkage means connecting said pusher operating means and said pivotal transfer plate for swinging the free end thereof upwardly from a position below the plane of said unloading supporting surface to a position above the plane thereof on the extending stroke of said pusher means, and control means operated in timed relation with said rack elevator for initiating operation of said pusher operating means as each rack shelf is raised to a position slightly above the free edge of said pivotal transfer plate.

7. In a rack type proofer, means for conducting a succession of racks in a closed loop including a rack elevator, means for continuously operating said rack elevator, said racks having a plurality of superimposed equidistantly spaced shelves, a loading and an unloading article supporting surface in front of and spaced from said rack elevator, said supporting surfaces being spaced a vertical distance apart equal at least to the spacing between a pair of successive rack shelves, a vertically swingable transfer plate pivotally mounted adjacent said unloading supporting surface and extending therefrom to the path of a rack on said elevator, pusher means associated with each of said article supporting surfaces, means for intermittently operating said pusher means through an extending stroke for sweeping articles on said extending stroke from said loading supporting surface onto a rack shelf and from a rack shelf across said pivotal transfer plate onto said unloading supporting surface and through a retracting stroke, linkage means connecting said pusher operating means and said pivotal transfer plate for swinging the free end thereof upwardly from a position below the plane of said unloading supporting surface to a position above the plane thereof on the extending stroke of said pusher means and downwardly to its first position on the retracting stroke of said pusher means, said pusher operating means being arranged to effect an extending and retracting cycle of said pusher means and a raising and lowering cycle of said pivotal transfer plate while said rack elevator is raised through a minor rack shelf space, and control means operated in timed relation with said rack elevator for initiating operation of said pusher operating means as each rack shelf is raised to a position slightly above the free end of said pivotal transfer plate.

8. In a rack type proofer, means for conducting a succession of racks in a closed loop including a rack elevator, means for continuously operating said rack elevator, said racks having a plurality of superimposed equidistantly spaced shelves,
a loading and an unloading article support in front of and spaced from said rack elevator, said supports being spaced a vertical distance apart equal at least to the spacing between a pair of successive rack shelves,
a transfer plate fixed to said loading article support and extending therefrom to the path of a rack on said rack elevator,
means pivotally supporting said loading article support,
a vertically swingable transfer plate pivotally connected to said unloading article support and extending therefrom to the path of a rack on said rack elevator,
pusher means associated with each of said article supports,
means for intermittently operating said pusher means through an extending and retracting stroke for sweeping articles on said extending stroke from said loading support across said fixed transfer plate onto a rack shelf and from a rack shelf across said pivotal transfer plate onto said unloading support,
linkage means associated with said pusher means for supporting said pivotal transfer plate in a downwardly sloping position and for supporting said fixed transfer plate and loading article support in the retracted position of said pusher means with the free edges of said pivotal and fixed transfer plates spaced apart a vertical distance greater than the spacing between a pair of successive rack shelves and for pivotally raising said pivotal transfer plate and said fixed transfer plate and loading article support on the extending stroke of said pusher means, and
control means operated in timed relation with said rack elevator for initiating operation of said pusher means when two successive rack shelves are respectively slightly below the free edge of said fixed transfer plate and slightly above the free edge of said pivotal transfer plate.

9. An apparatus in accordance with claim 8 wherein said fixed transfer plate and loading article support are disposed in an upwardly sloping position from the free edge of said fixed transfer plate to the edge of said loading article support remote from said rack elevator, in the retracted position of said pusher means.

10. An apparatus in accordance with claim 8 wherein said linkage means is arranged to raise the free end of said pivotal transfer plate in overtaking relation with a rack shelf and to raise the free end of said fixed transfer plate at the same rate as a rack shelf, on the extending stroke of said pushers.

11. An apparatus in accordance with claim 8 wherein said linkage means is arranged to pivotally move said pivotal transfer plate from a downwardly to an upwardly sloping position, on the extending stroke of said pusher means.

12. In an article handling apparatus,
a plurality of article carriers,
means for conducting a succession of carriers in a closed loop including carrier elevating means,
means for continuously operating said carrier elevating means,
an article receiving support disposed in front of said carrier elevating means,
an unloading pusher including a frame having a transversely extending front pusher bar normally disposed rearwardly adjacent the path of a carrier on said elevating means,
longitudinally spaced rear and front guide supports supporting said frame for reciprocatory travel,
operating means imparting reciprocatory movement to said unloading pusher in an extending stroke across the path of said carrier elevating means for pushing articles from a carrier onto said article receiving support and in a retracting stroke out of the path of said carrier elevating means,
said rear guide support being fixed against vertical movement,
means mounting said front guide support for vertical movement including means limiting downward movement thereof to normally support said pusher frame in forwardly and downwardly sloping position in its retracted position, and
control means operated in timed relation with said elevating means for activating said operating means to initiate reciprocatory movement of said unloading pusher when a carrier is subjacent said front pusher bar in said normally forwardly and downwardly sloping position of said pusher frame, said pusher frame pivoting upwardly about said rear guide support as a fulcrum as said front pusher bar is raised by said continuously upwardly moving carrier during reciprocatory travel of said front pusher bar across said upwardly moving carrier.

13. An article handling apparatus in accordance with claim 12, wherein said operating means includes driving means moving said pusher frame from its retracted to its fully extended position in coincidence with elevation of said pusher frame by said upwardly moving carrier from said forwardly and downwardly sloping normal position to a substantially horizontal position.

References Cited
UNITED STATES PATENTS

| | | | |
|---|---|---|---|
| 1,901,928 | 3/1933 | Olson | 214—16.4 |
| 2,645,367 | 7/1953 | Stabile | 214—16.1 |
| 2,685,374 | 8/1954 | Croston | 214—16.4 |
| 2,734,617 | 2/1956 | Temple | 198—31 |
| 3,068,987 | 12/1962 | Franklin | 214—16.6 X |
| 3,168,187 | 2/1965 | Thomas et al. | 214—16.4 |

GERALD M. FORLENZA, *Primary Examiner.*

R. B. JOHNSON, *Assistant Examiner.*